June 25, 1957 E. M. ROSCHKE 2,797,260

SUBSCRIPTION TELEVISION SYSTEM

Filed Jan. 30, 1952

INVENTOR:
ERWIN M. ROSCHKE
BY Francis W. Crotty
HIS ATTORNEY.

United States Patent Office 2,797,260

Patented June 25, 1957

2,797,260

SUBSCRIPTION TELEVISION SYSTEM

Erwin M. Roschke, Des Plaines, Ill., assignor to Zenith Radio Corporation, a corporation of Illinois Application January 30, 1952, Serial No. 268,966

6 Claims. (Cl. 178—22)

Figure 1:
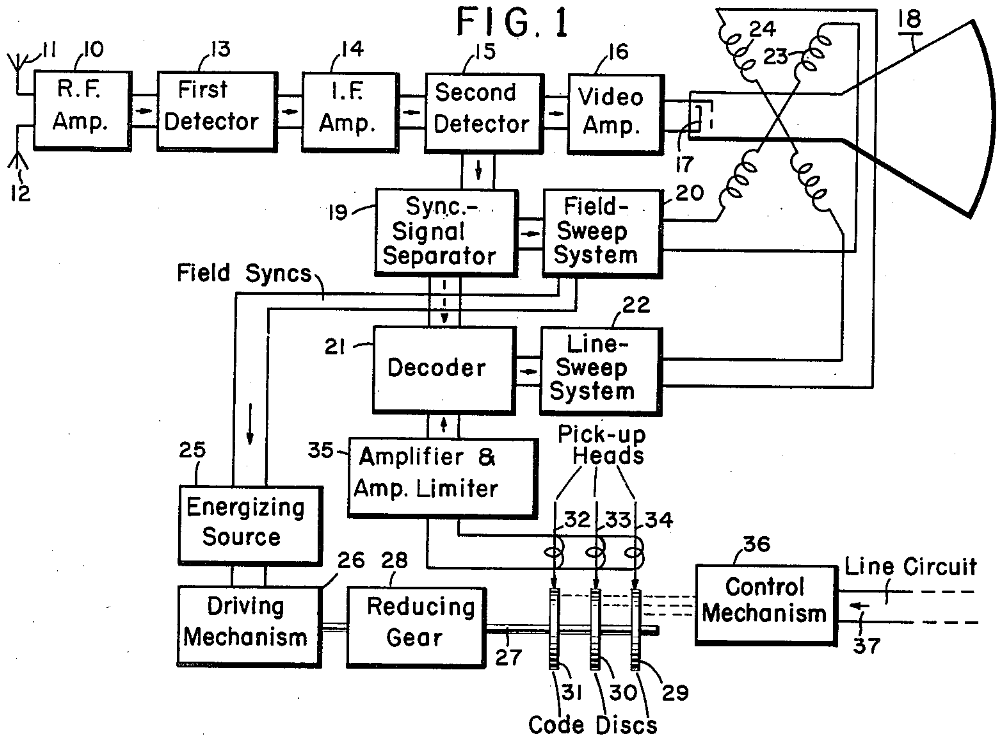

This invention relates to subscription television systems and more particularly to improved actuating apparatus for establishing a code schedule representation for such systems. Since the invention may be practiced in either a transmitter or receiver, the term "encoding" is used herein in its generic sense to encompass either coding at the transmitter or decoding at the receiver.

In the art of subscription television a coded television signal is radiated to preclude its utilization except by receivers having appropriate decoding apparatus for decoding the telecast. In some known forms of subscription systems, the coding apparatus included in the transmitter controls the scansion of the cathode-ray picture-converting device to vary the timing thereof in an irregular fashion and in accordance with a repeating coding schedule. This results in a variable time relation between the video and synchronizing components of the radiated television signal, effectively coding that signal since image reproduction in standard television receivers depends upon an invariable time relation between such components. The decoding apparatus of subscriber receivers, however, controls the scansion of the cathode-ray image-reproducing tube to compensate for the timing variations in the radiated signal, enabling the reproducing tube to reproduce the image intelligence.

Many arrangements have been proposed for controlling the scansion of the cathode-ray tube at the transmitter and at the subscriber receivers to effect coding and decoding of the television signal as described above. In one system, for example, a code disc is provided at the transmitter having a selected coding schedule magnetically recorded about its periphery in the form of pulses of irregular width and separation. The code disc is scanned recurrently by an appropriate scanning means to produce a coding signal consisting of a repeating series of pulse components corresponding to the pulses recorded on the disc. The coding signal is employed to actuate coding apparatus coupled to the scanning system of the transmitter picture tube to shift the timing of the scansion thereof for the duration of each of the pulse components. This causes the transmitter to radiate a television signal coded in the manner previously described. A similar code disc, having an identical coding schedule recorded thereon, is included in each subscriber receiver to be scanned in synchronism and phase with the coding disc at the transmitter in order to produce a decoding signal which is substantially the same as the coding signal. The decoding signal is employed to actuate decoding apparatus in the receiver effectively to decode the television signal and enable the image-reproducing device to reproduce the image intelligence.

One inherent disadvantage of such systems is that they do not possess that degree of flexibility that may be desirable for a subscription service. It is manifest that each time the coding schedule at the transmitter is changed, a corresponding change must be made at the subscriber receivers, and any such change necessitates the acquisition of a new code disc and its incorporation in any subscriber receiver that is to continue to utilize the subscription broadcast. In these systems it is contemplated that the various subscribers will purchase a new code disc at stated intervals, for example, once a week. It has been found, however, that when one repeating code schedule is used for any appreciable period of time, the susceptibility of the system to unauthorized decoding and utilization of the subscription signal is undesirably increased. It is apparent that frequent changes of the coding schedule discourage unauthorized use of the service, especially if any particular coding schedule is used for such a short interval that analysis of the schedule is rendered impossible as a practical matter.

The improved apparatus of the present invention is capable of supplying an encoding signal, representing a selected coding schedule, to coding apparatus of the transmitter and/or to corresponding decoding apparatus at the various receivers. However, unlike the prior art devices, this apparatus can be controlled in a simple manner to alter the coding schedule represented by the encoding signal, and this can be achieved without the need of replacing code discs or the like. For example, when such apparatus is used in a subscriber receiver, it may be controlled by pulses derived from the transmitter or from a distribution center, so that at the end of each program or at more frequent intervals the encoding signal may be adjusted to represent a different selected coding schedule. Should a subscriber desire any particular program, he may call the distribution center and have his apparatus adjusted in accordance with the coding schedule of that program. The coding schedule of the system may therefore be altered at frequent intervals to enhance secrecy and, moreover, the subscription charges may be equitably assessed since the subscriber may be charged only for programs actually requested rather than for a series of programs some of which may not be viewed by him.

It is, accordingly, an object of the present invention to provide improved apparatus for use in a subscription television system for supplying an encoding signal to encoding apparatus therein and which is constructed in such a manner that disadvantages inherent in the prior-art devices are overcome.

It is another object of the present invention to provide a novel apparatus for developing an encoding signal.

It is still another object of the present invention to provide an arrangement for representing the code schedule of a received coded television signal.

A further object of the invention is to provide such improved apparatus for use in a subscription television system which enables the coding schedule employed in such system to be altered at frequent intervals to provide a high degree of secrecy and to enable service charges to be placed on a fair basis.

In accordance with one aspect of the subject invention, apparatus is provided for developing an encoding signal in a subscription television system. That apparatus comprises a signal-storage unit including a series of record-storage devices individually bearing a code pattern. The apparatus further comprises a scanning unit including a corresponding series of sensing devices for individually reading an assigned one of the record-storage devices to derive therefrom a control signal representing the code pattern recorded thereon. Further, there are means for effecting relative rotation of the storage and scanning units to accomplish recurrent scanning of the several record-storage devices. Means are provided for utilizing the control signals from the record-storage devices to produce an encoding signal representing a code schedule determined by the particular code patterns of the devices and also by the instantaneous relative orientation of the devices. In order to facilitate establishing a particular code setting in the apparatus there is a mounting arrangement which supports either the series of record-storage devices or the series of sensing devices in a manner to permit relative rotation of the members of the particular series with respect to one another. There is a code setting or adjusting apparatus which includes a step-by-step driving mechanism which responds to an applied pulse signal for rotating at least one of the series of devices relative to the remaining devices of that series a number of incremental angular steps determined by the number of applied pulses so as to vary the relative rotation of the devices of that series. Finally, means are provided for applying a pulse signal to the code setting apparatus.

According to another aspect of the present invention, the apparatus for developing an encoding signal includes a series of individually adjustable code-determining elements each of which has a series of operating positions including a reference position. A reset mechanism is provided for setting each of the code-determining elements to its reference position. There is an actuating mechanism including means for selectively displacing any one of the code-determining elements from its reference position to another of its operating positions. Means are provided for supplying a control signal to the actuating mechanism having a characteristic conveying information concerning a predetermined code schedule representing a predetermined operating position of at least a selected one of the code-determining elements to operate the actuating mechanism and displace the one code-determining element from its reference position to its predetermined operating position. The apparatus also has means dependent upon the effective operating positions of the code-determining elements for deriving an encoding signal representing the coding schedule.

In accordance with still another aspect of the invention, an arrangement is provided for representing the code schedule of a received coded television signal for use in a subscription television receiver. This arrangement comprises a series of individually adjustable elements each of which has a series of operating positions including a reference position, and a reset mechanism for setting each of the adjustable elements to its reference position. There is an actuating mechanism including means for selectively displacing any one of the adjustable elements from its reference position to another of its operating positions. Means are provided for supplying to the actuating mechanism a sequence of received control signals conveying information concerning a predetermined code schedule selected ones of which control signals represent a predetermined operating position of respective ones of the adjustable elements to operate the actuating mechanism and displace each of the adjustable elements from its reference to its predetermined operating condition to establish collectively the code schedule representation.

Figure 2:
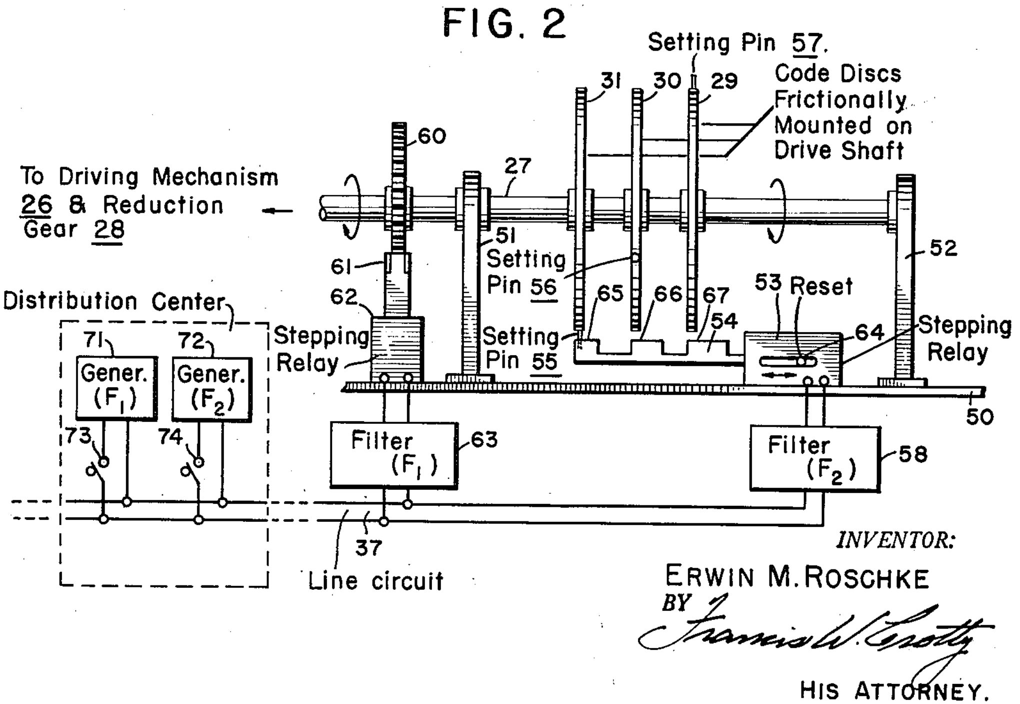

The features of the present invention which are believed to be new are set forth with particularity in the appended claims. The invention itself, however, together with further advantages thereof may best be understood by reference to the following description when taken in conjunction with the accompanying drawing, in which:

Figure 1 shows a subscription television receiver incorporating the improved apparatus of this invention, and, Figure 2 shows a preferred embodiment of the invention.

The receiver of Figure 1, as explained more fully hereinafter, includes a decoder which is actuated by a decoding signal to perform its decoding function. This decoding signal is obtained from a plurality of individual control signals derived by scanning a corresponding plurality of code records, and the decoding signal represents a coding schedule determined conjointly by the coding information stored in each of the code records and the relative phase of the control signals. The subscription transmitter may include a coder actuated by a coding signal representing a coding schedule identical to that controlling the decoding signal referred to above and the coding signal also may be obtained from a plurality of individual control signals derived from a corresponding plurality of code records having coding information stored therein identical to that stored in the records at the receiver. The coding schedule at the transmitter may be altered from time to time merely by changing the phase relation between the individual control signals, without the need of altering the coding information stored in the various records or renewing the records. Whenever the coding schedule is so changed at the transmitter, the schedule at the subscriber receiver may be brought into conformity merely by adjusting the phase relation of the individual control signals at the receiver to be identical to the phase relation used at the transmitter. In this manner, the same code records may be used at the transmitter and receiver for long periods of time, if not indefinitely, and yet the coding schedule is extremely flexible for it may be frequently changed at the transmitter in the above-described manner and, as will become apparent, similar changes can be effected at the receiver by means of a simple mechanism.

More particularly the receiver includes a radio-frequency amplifier 10 having input terminals connected to an antenna circuit 11, 12 and output terminals connected to a first detector 13. The first detector is coupled through an intermediate-frequency amplifier 14 to a second detector 15 which, in turn, is coupled through a video amplifier 16 to the input electrodes 17 of a cathode-ray image reproducing device 18. Second detector 15 is further connected to a synchronizing-signal separator 19 having output terminals coupled to a field-sweep system 20 and through a decoder 21 to a line-sweep system 22. The output terminals of sweep systems 20 and 22 are connected to field- and line-deflection elements 23, 24 associated with reproducing device 18.

Field-sweep system 20 supplies field-synchronizing pulses to an energizing source 25 for synchronizing purposes and the output terminals of source 25 are connected to a driving mechanism 26 which drives a shaft 27 through a reducing gear 28. A plurality of code discs 29, 30 and 31 are mounted on shaft 27 in frictional relation therewith and for rotation thereby. Each of the code discs has coding information recorded thereon representing a selected code pattern. For example, they may be composed of a magnetic material and the coding information may take the form of an irregular series of pulses magnetically recorded about the periphery of each disc. The discs are scanned by pick-up heads 32, 33 and 34 which are connected together and coupled through a common mixer amplifier and amplitude limiter 35 to decoder 21 The individual phase relation of each code disc with its associated pick-up head is controlled by a control mechanism 36 in a manner to be described, the control mechanism in turn being actuated by a series of key-signal bursts received over line circuit 37 from the subscription transmitter or from a distribution center, as also will be described.

The receiver may be tuned to receive the subscription television signal from the transmitter which is coded in the aforesaid manner. That is, the subscription television signal may be one in which the time relation of its video and synchronizing components varies from time to time in accordance with a coding schedule. The radiated signal is intercepted by antenna circuit 11, 12 and amplified in radio-frequency amplifier 10. The amplified signal is heterodyned to the selected intermediate frequency of the receiver in first detector 13 and the resulting intermediate-frequency signal is amplified in amplifier 14 and detected in second detector 15 to produce a composite video signal. The video signal is amplified in video amplifier 16 and applied to input electrodes 17 to control the intensity of the cathode-ray beam in reproducing device 18 in accordance with the image intelligence. The synchronizing components of the received television signal are separated in unit 19 and this unit applies field-synchronizing pulses to sweep system 20 to synchronize the field scansion of device 18 and line-synchronizing pulses through decoder 21 to sweep system 22 to synchronize the line scansion of the device.

Driving mechanism 26 is energized from source 25 and drives shaft 27 through reducing gear 28 so that code discs 29, 30 and 31 may be rotated at a selected speed. Similar apparatus may be incorporated into the subscription transmitter and, to synchronize the rotation of discs 29–31 with the rotation of corresponding discs at the transmitter, source 25 is controlled by field-synchronizing pulses derived from field-sweep system 20. It is preferred that the rotation of the discs be at some submultiple of the field frequency so that the encoding signal derived therefrom may, in each scanning cycle of the discs, embrace a multiplicity of fields. It is for that reason that the reducing gear 28 is introduced between the driving mechanism and the drive shaft.

As code discs 29–31 are rotated, they are scanned recurrently by pick-up heads 32–34 which produce a plurality of individual control signals respectively representing the code pattern of the coding information recorded on the discs. The individual control signals are combined and amplitude limited in unit 35 to produce a decoding signal representing a coding schedule determined conjointly by the code patterns recorded on the various discs and the phase relation of the individual control signals. As previously mentioned, the code discs are frictionally mounted on drive shaft 27 and may be adjusted in a manner to be described to have any desired angular position on the shaft. This adjustment establishes the phase relation of the individual control signals and determines the coding schedule represented by the decoding signal. The adjustment of the code discs is accomplished by control mechanism 36 under the control of a series of key-signal bursts obtained from a distribution center as will be described, and this adjustment is such that the coding schedule represented by the decoding signal is identical to the schedule represented by the coding signal at the transmitter.

When the decoding signal represents the same coding schedule as the coding signal at the transmitter, the decoding signal actuates decoder 21 in time coincidence with the actuation of a similar coding unit at the transmitter to vary in a compensating sense the timing of the line-synchronizing pulses applied to line-sweep system 22 whenever the timing of the video and synchronizing components of the incoming subscription television signal is varied. That is, should the coder at the transmitter advance the timing of the video components relative to the line synchronizing components of the subscription signal during selected intervals determined by the coding schedule represented by the coding signal, decoder 21 responds to the decoding signal produced by unit 35 to impart a corresponding advance to the line-synchronizing components applied to sweep system 22 at the same intervals to compensate the line scansions of reproducing device 18, enabling it to reproduce the image intelligence.

The coding schedule represented by the coding signal at the transmitter may be varied from time to time merely by altering the phase relation of the individual coding signals developed by the several code discs. The coding schedule represented by the decoding signal at the receiver may, likewise, be changed in correspondence with such changes at the transmitter by key-signal bursts transmitted over line circuit 37. These key-signal bursts can be established on the line circuit by a pair of generators 71, 72 located at the transmitter or at a distribution center as indicated in Figure 2. Generator 71 develops a key signal having a frequency $F_1$ whereas generator 72 develops a key signal having a frequency $F_2$. Keys 73 and 74 are included in the connections between the generators and the line circuit so that bursts of one or the other of the key signals may be impressed upon the line circuit in a desired sequence. These keys may be operated manually in response to a request by a subscriber for the key-signal information, or may be controlled by any suitable automatic means so that the key-signal bursts representing a selected coding schedule for the decoding signal may be impressed on the line circuit in response to such a request. The key-signal bursts actuate control mechanism 36, in a manner to be described, to adjust the angular position of code discs 29–31 on shaft 27 so that their orientation matches that of the corresponding discs at the transmitter and the coding schedule represented by the decoding signal is identical to that represented by the coding signal at the transmitter. It is convenient to supply the key signals to the receiver prior to the subscription telecast of any particular program, and at the subscribers' request, to facilitate assessing a program fee.

Once the orientation of discs 29–31 on shaft 27 has been adjusted to match the position of the corresponding discs at the transmitter, proper phasing between the code discs at the receiver and transmitter may be maintained in any known means. For example, the phasing arrangement disclosed in copending application Serial No. 75,988, filed February 12, 1949, issued October 20, 1953, as Patent 2,656,407, in the name of Roswell H. Herrick et al., entitled Subscriber Signalling System and assigned to the present assignee may be used to advantage.

The various components of the receiver of Figure 1, apart from the arrangement of discs 29–31 and control mechanism 36, are either well known to the art or are described in detail in Patent 2,547,598, issued on April 3, 1951, to E. M. Roschke, and assigned to the present assignee. For that reason a further description of such components is deemed to be unnecessary.

A preferred arrangement for code discs 29–31 and control mechanism 36 is shown in Figure 2. In this arrangement drive shaft 27 is rotatably supported on a base 50 by brackets 51 and 52 and code discs 29, 30 and 31 are mounted on the drive shaft in frictional engagement therewith for rotation thereby. A stepping relay 53 is provided and actuates a toothed or notched armature 54. A plurality of setting pins 55, 56 and 57 are respectively attached to the peripheries of the code discs to engage the various teeth 65, 66 and 67 of armature 54, under certain conditions, selectively to prevent rotation of the discs as shaft 27 is rotated during a code-setting operation to be considered presently. Teeth 65, 66 and 67 are of different widths, being successively broader from tooth 65 to tooth 67. When armature 54 is in its extreme position illustrated in the drawing, all the teeth are positioned directly under their associated discs so that pins 55, 56 and 57 engage the teeth and rotation of all the discs is prevented. When the armature is moved one step to the left pin 55 is released but, since teeth 66 and 67 are wider than tooth 65, pins 56 and 57 still engage these teeth. When the armature is moved another step to the left, pin 56 is also released and, since tooth 67 is broader than tooth 66, pin 57 is still engaged. When the armature is moved a final step to the left all the pins are released. Stepping relay 53 has a pair of input terminals connected to line circuit 37 through a filter 58 selective to the frequency $F_2$ of the key-signal bursts from generator 72. Shaft 27 also has a ratchet wheel 60 affixed thereto, and a stepping pawl 61 actuated by a relay 62 is positioned to engage the ratchet wheel. Relay 62 has input terminals connected to line circuit 37 through a filter 63 selective to the frequency $F_1$ of the key-signal bursts from generator 71.

During any code-setting operation, the relative angular position or orientation of discs 29–31 on shaft 27 is adjusted in order that a selected phase relation may exist between the individual control signals derived from the discs. To that end, the driving mechanism of Figure 1 is first de-energized to place the rotation of the drive shaft under the control of stepping relay 62 and ratchet 60, 61. The toothed armature 54 of relay 53 is placed in a re-set or reference position shown in Figure 2. This may be accomplished manually by means of a re-set control 64, or automatically in response to a re-set key signal burst transmitted over line circuit 37 and used to shift armature 54 to its reference position. When the armature is in its reference position, teeth 65, 66 and 67 lie directly under discs 29–31 in the paths of pins 55–57.

To actuate relay 62 a series of key-signal bursts from generator 71 at the distribution center is transmitted on line circuit 37, the bursts having a distinctive frequency $F_1$ for selection by filter 63 and application to relay 62. The actuation of stepping relay 62 by such key-signal bursts causes step-wise rotation of shaft 27 and code discs 29–31. The distribution center sends a sufficient number of key-signal bursts from generator 71 to effect at least one complete revolution of the drive shaft and consequently the stop pin of each of the code discs is driven into engagement with one of teeth 65–67 of armature 54. In this manner all the code discs are aligned in a reference angular position relative to each other.

The distribution center now terminates the bursts of key signal from generator 71 and transmits a single key-signal burst from generator 72 for selection by filter 58 and application to stepping relay 53. This advances armature 54 one step to the left as viewed in Figure 2 and frees disc 31, but rotation of discs 29 and 30 is still prevented due to the greater widths of armature teeth 66 and 67. The distribution center now transmits a pre-selected number of key-signal bursts from generator 71 to actuate relay 62 and rotate disc 31 a selected amount relative to discs 29 and 30. Thereafter, another burst of key signal from generator 72 is transmitted on the line circuit to move armature 54 another step to the left. Disc 30 is now free to rotate, but the rotation of disc 29 is still prevented due to the greater width of tooth 67. Relay 62 is again stepped in response to a preselected number of key-signal bursts from generator 71 so that discs 30 and 31 are rotated a selected amount relative to disc 29. A final burst of key signal from generator 72 is received on the line circuit to move the armature 54 yet another step to the left, releasing disc 29 so that all discs are now free to be rotated by shaft 27. By the appropriate selection of the key signal bursts distributed to the subscriber receiver, the angular positions of discs 29–31 may be so established that the coding schedule represented by the decoding signal at the receiver corresponds to that represented by the coding signal at the transmitter. It is manifest that the code setting operation may be carried out in a very short interval preferably prior to the start of each subscription program.

The invention provides, therefore, a novel arrangement for representing the code schedule of a telecast. More specifically, it provides improved apparatus for supplying an encoding signal to encoding apparatus either at a subscription television transmitter or at the various subscriber receivers. The apparatus is constructed to develop an encoding signal whose code schedule may be altered at frequent intervals merely by the adjustment of the phase relation of a plurality of individual control signals which make up the encoding signal. As pointed out herein, the use of the apparatus of this invention in a subscription television system enables the secrecy of the system to be enhanced by frequent changes of the coding schedule and, moreover, enables charges for the subscription service to be placed on an eminently fair basis.

Certain features described in the present application are disclosed and claimed in copending applications Serial No. 255,559, filed November 9, 1951 in the name of Erwin M. Roschke, and now abandoned Serial No. 228,307, filed May 25, 1951 in the name of Alexander Ellett, both of which are assigned to the present assignee.

While a particular embodiment of the invention has been shown and described, modifications may be made, and it is intended in the appended claims to cover all such modifications as may fall within the true spirit and scope of the invention.

I claim:

1. In a subscription television system, apparatus for developing an encoding signal comprising: a signal-storage unit including a series of record-storage devices individually bearing a code pattern; a scanning unit including a corresponding series of sensing devices for individually reading an assigned one of said record-storage devices to derive therefrom a control signal representing the aforesaid code pattern recorded thereon; means for effecting relative rotation of said units to accomplish recurrent scanning of said record-storage devices; means for utilizing the control signals from said record-storage devices to produce an encoding signal representing a code schedule determined by the particular code patterns of said devices and also by the instantaneous relative orientation of said devices; a mounting arrangement supporting a particular one of the aforesaid series of devices to permit relative rotation of the devices of that series with respect to one another; a code setting apparatus including a step-by-step driving mechanism for said particular series and responsive to an applied pulse signal for rotating at least one device of said particular series relative to the remaining devices of that series a number of incremental angular steps determined by the number of applied pulses to vary the relative orientation of the devices of said particular series; and means for applying a pulse signal to said code setting apparatus.

2. In a subscription television system, apparatus for developing an encoding signal comprising: a signal-storage unit including a series of record-storage devices individually bearing a code pattern; a scanning unit including a corresponding series of sensing devices for individually reading an assigned one of said record-storage devices to derive therefrom a control signal representing the aforesaid code pattern recorded thereon; means for effecting relative rotation of said units to accomplish recurrent scanning of said record-storage devices; means for utilizing the control signals from said record-storage devices to produce an encoding signal representing a code schedule determined by the particular code patterns of said devices and also by the instantaneous relative orientation of said devices; a mounting arrangement supporting a particular one of the aforesaid series of devices to permit relative rotation of the devices of that series with respect to one another; a code setting apparatus including a reset mechanism for establishing each device of said particular series in a reference position with respect to said mounting arrangement and further including a step-by-step driving mechanism responsive to an applied pulse signal for rotating at least one device of said particular series relative to the remaining devices of that series a number of incremental angular steps determined by the number of applied pulses from said reference position to establish a predetermined relative orientation of the devices of said particular series; and means for applying a pulse signal to said step-by-step driving mechanism.

3. In a subscription television system, apparatus for developing an encoding signal comprising: a signal-storage unit including a series of record-storage devices individually bearing a code pattern; a scanning unit including a corresponding series of sensing devices for individually reading an assigned one of said record-storage devices to derive therefrom a control signal representing the aforesaid code pattern recorded thereon; means for effecting relative rotation of said units to accomplish recurrent scanning of said record-storage devices; a mounting arrangement supporting a particular one of the aforesaid series of devices to permit relative rotation of the devices of that series with respect to one another; a code setting apparatus including a reset mechanism for locking each device of said particular series in a reference position with respect to said mounting arrangement and further including a step-by-step driving mechanism for rotating at least one device of said particular series relative to the remaining devices of that series; means responsive to one received signal for sequentially releasing said devices of said particular series from said reset mechanism; and means responsive to another received signal to actuate said step-by-step driving mechanism to rotate the released devices of said particular series to establish a predetermined relative orientation of the devices of said particular series.

4. In a subscription television system, apparatus for developing an encoding signal comprising: a series of individually adjustable code-determining elements each of which has a series of operating positions including a reference position; a reset mechanism for setting each of said code-determining elements to its aforesaid reference position; an actuating mechanism including means for selectively displacing any one of said code-determining elements from its reference position to another of its aforesaid operating positions; means for supplying a control signal to said actuating mechanism having a characteristic conveying information concerning a predetermined code schedule representing a predetermined operating position of at least a selected one of said code-determining elements to operate said actuating mechanism and displace said one code-determining element from its reference to its aforesaid predetermined operating position; and means dependent upon the effective operating positions of said code-determining elements for deriving an encoding signal representing said coding schedule.

5. In a subscription television receiving system, apparatus for developing an encoding signal comprising: a series of individually adjustable code-determining elements each of which has a series of operating positions including a reference position; a reset mechanism responsive to a reset signal for setting each of said code-determining elements to its aforesaid reference position; means for supplying a received reset signal to said reset mechanism; an actuating mechanism including means for selectively displacing any one of said code-determining elements from its reference position to another of its aforesaid operating positions; means for supplying to said actuating mechanism a sequence of received control signals conveying information concerning a particular code schedule, selected ones of which control signals represent a predetermined operating position of respective ones of said code-determining elements to operate said actuating mechanism and displace each of said ones of said code-determining elements from its reference to its aforesaid predetermined operating position; and means dependent upon the effective operating positions of said code-determining elements for deriving an encoding signal representing said coding schedule.

6. An arrangement for representing the code schedule of a received coded television signal for use in a subscription television receiver comprising: a series of individually adjustable elements each of which has a series of operating positions including a reference position; a reset mechanism for setting each of said adjustable elements to its aforesaid reference position; an actuating mechanism including means for selectively displacing any one of said adjustable elements from its reference position to another of its aforesaid operating positions; and means for supplying to said actuating mechanism a sequence of received control signals conveying information concerning a predetermined code schedule, selected ones of which control signals represent a predetermined operating position of respective ones of said adjustable elements to operate said actuating mechanism and displace each of said adjustable elements from its reference to its aforesaid predetermined operating condition to establish collectively said code schedule representation.

References Cited in the file of this patent

UNITED STATES PATENTS

| | | |
|---|---|---|
| 1,381,317 | Loughridge | June 14, 1921 |
| 1,657,366 | Belin | Jan. 24, 1928 |
| 1,724,210 | Loughridge | Aug. 13, 1929 |
| 1,912,983 | Jipp et al. | June 6, 1933 |
| 2,403,059 | Dillenback et al. | July 2, 1946 |
| 2,425,616 | Hallberg et al. | Aug. 12, 1947 |
| 2,513,402 | Cooley | July 4, 1950 |
| 2,531,528 | Potts | Nov. 28, 1950 |
| 2,545,770 | Fillett et al. | Mar. 20, 1951 |
| 2,573,349 | Miller et al. | Oct. 30, 1951 |
| 2,656,407 | Herrick et al. | Oct. 20, 1953 |
| 2,656,410 | Herrick et al. | Oct. 20, 1953 |